Patented May 30, 1939

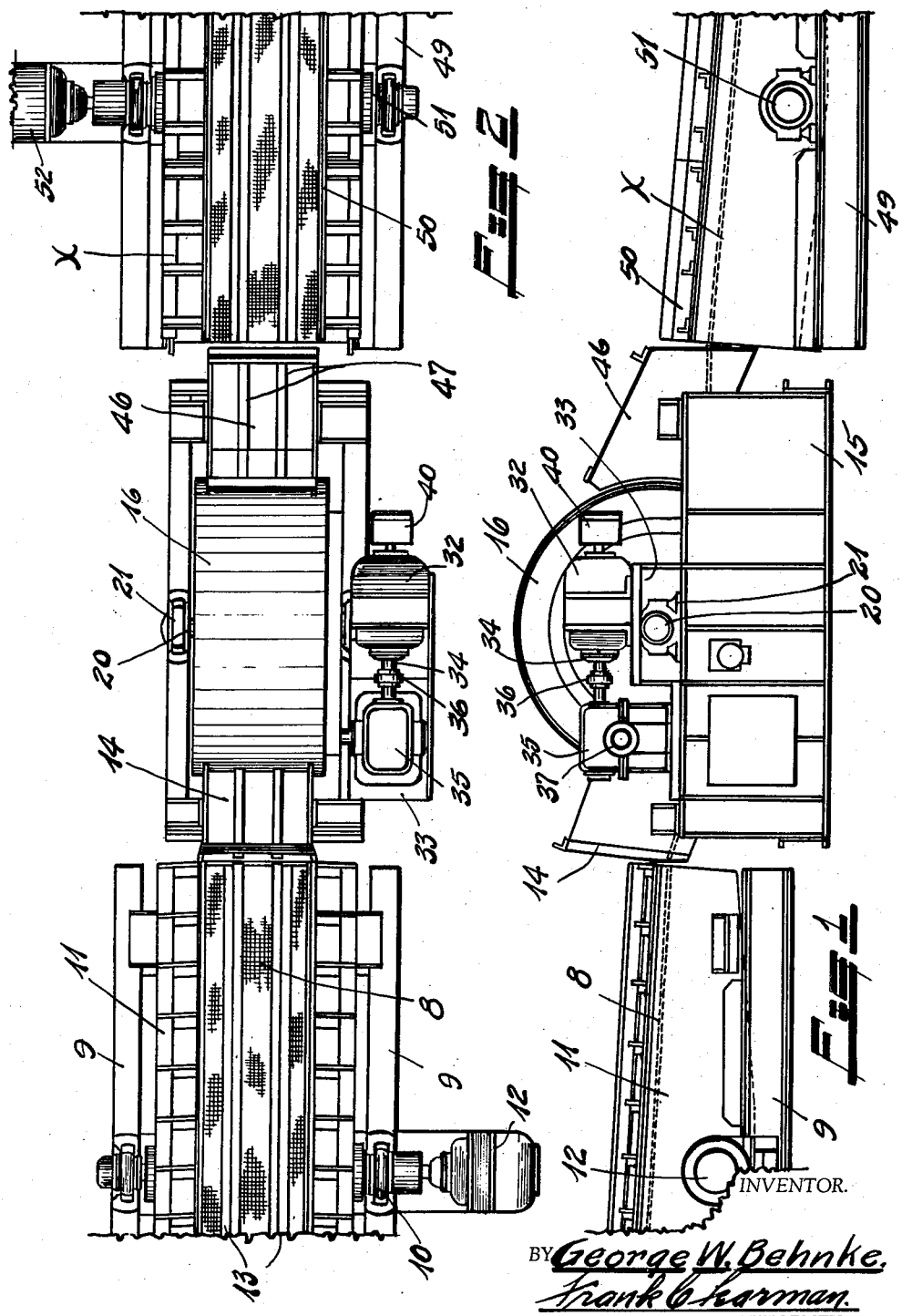

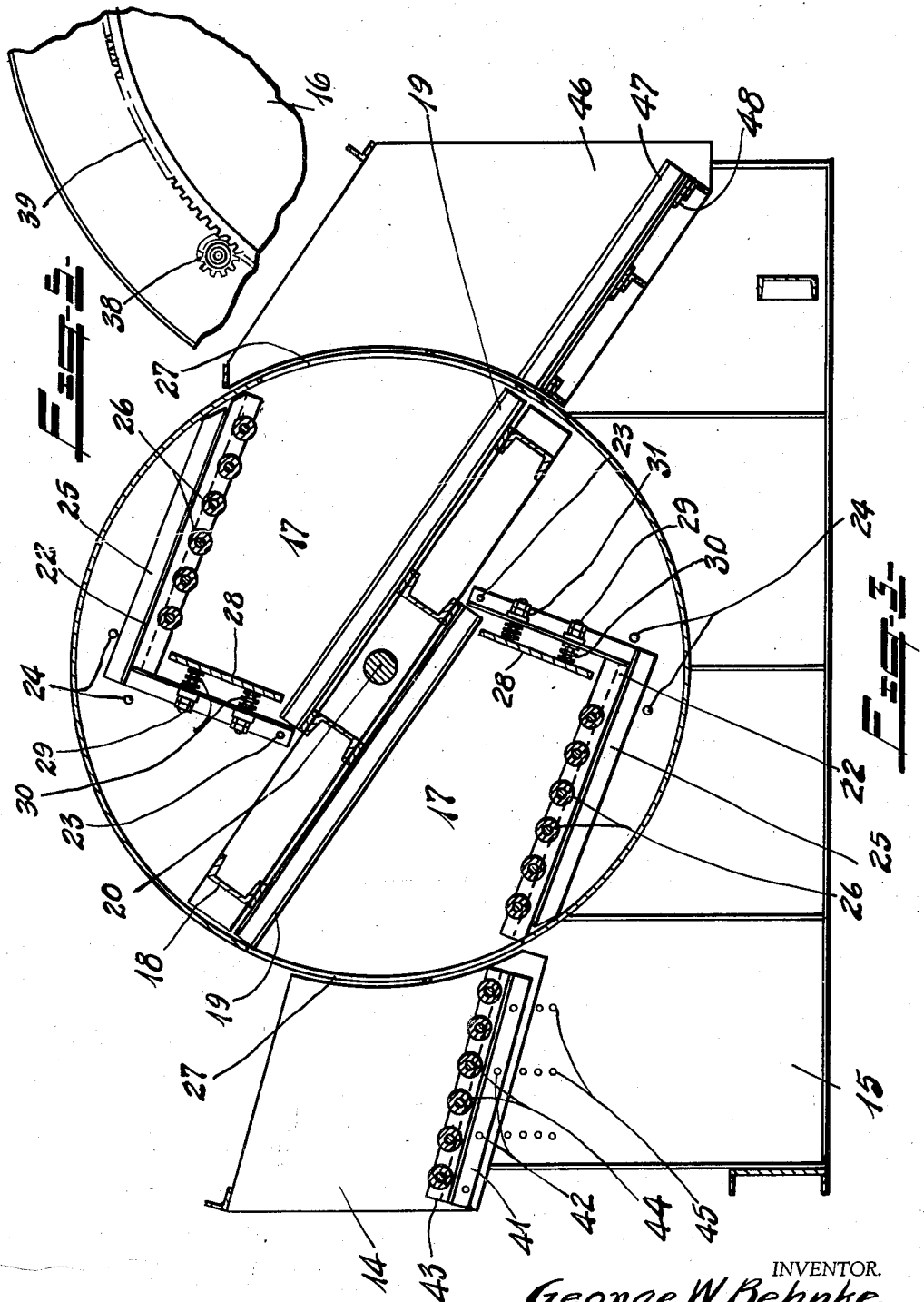

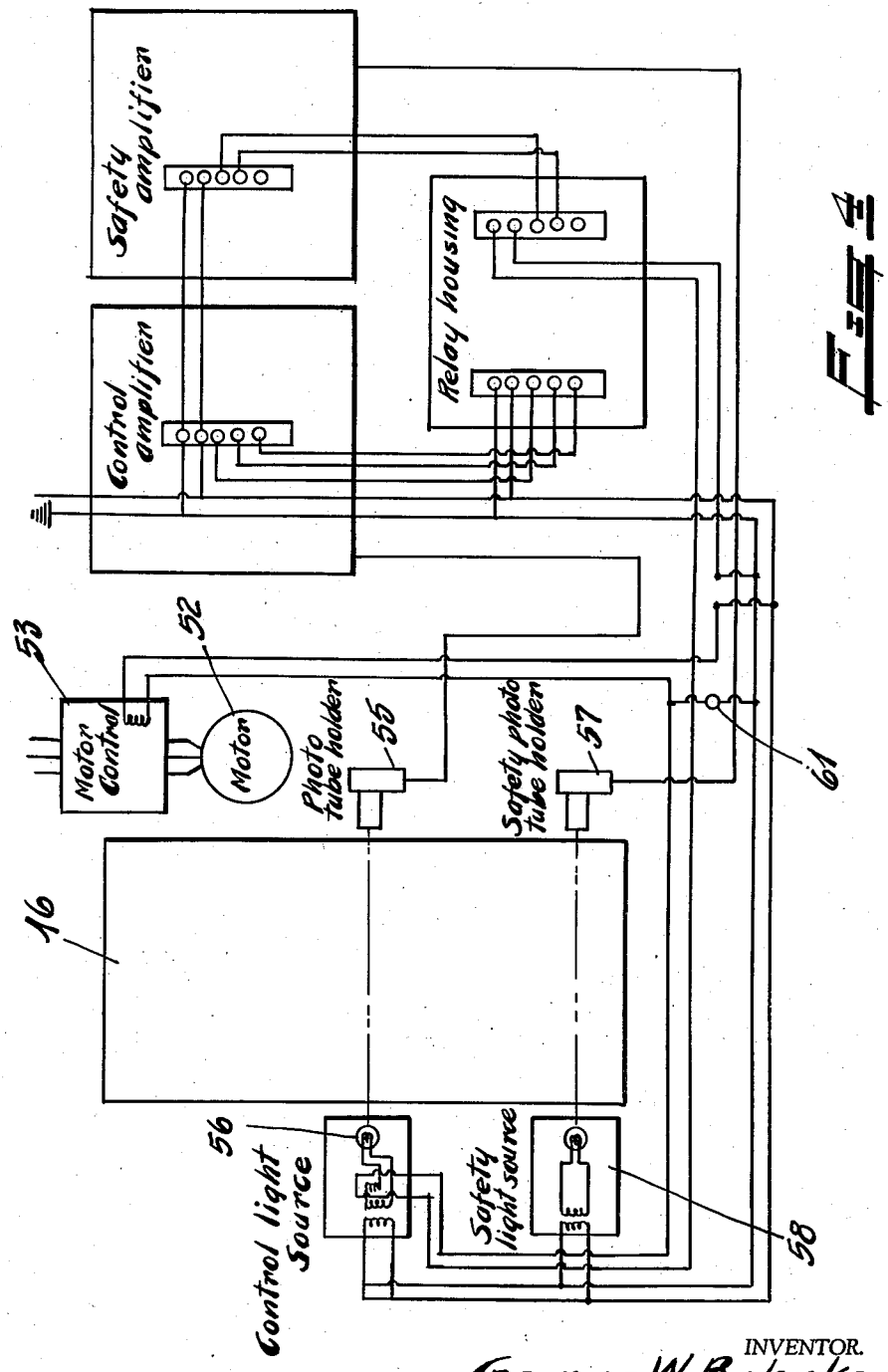

2,160,581

UNITED STATES PATENT OFFICE 2,160,581

TURN-OVER DEVICE

George W. Behnke, Durand, Mich.

Application April 1, 1937, Serial No. 134,256

7 Claims. (Cl. 22—1)

This invention relates to article handling devices, and more specifically to a turn-over device for turning hot, heavy blocks and similar articles from inverted to upright position or vice versa, so that they are discharged in upright or any other desired position.

A further object is to provide simple, practical, and substantial, automatic means for turning motor blocks and/or the like from inverted to upright position in a smooth and efficient manner, so that they may be discharged in upright position to facilitate cleaning, easy handling, or crating for shipment without injury to the block, and with a minimum of effort and attention.

A further object is to provide automatic means for turning inverted articles to upright position, which requires no attendant or attention, and which is provided with means for automatically starting when a block slides into place, as well as means for stopping when the mechanism with the block therein is in certain predetermined position, said means positively controlling the starting and stopping of the device.

Another object is to provide a method for mechanically handling hot blocks and similar articles in the foundry or other plant on a production basis, and which would be difficult for workmen to handle due to the weight and heat of the fresh cast block.

With these and other objects in view, this invention resides in the novel features of construction, formation, combination, and arrangement of parts to be hereinafter more fully described, claimed and illustrated in the accompanying drawings in which:

Fig. 1 is a side elevational view of my block turning device showing the gyrating screens or conveyors associated therewith.

Fig. 2 is a top plan view.

Fig. 3 is an enlarged sectional side elevational view of the turning device.

Fig. 4 is a schematic wiring diagram showing the automatic starting and stopping means etc.

Fig. 5 is an enlarged fragmentary view showing the drum drive.

In foundrys and similar plants where large structures such as cylinder blocks, etc., are cast, it is necessary to shake out the moulding sand, cores, or pipes which form a part of the mould, these blocks, etc. have recesses and chambers therein, some of which open in one direction, while others open in the opposite direction, and in order to facilitate this shake out, the hot block or article is first placed on an inclined gyrating screen in an inverted position, so that the sand, cores, pipes, etc. shake out as the block travels over the screen. Upon reaching the end of the screen the block is still hot and in inverted position, and must now be turned upright to shake out the sand etc. from chambers etc. which open in the opposite direction, and I have, therefore, perfected simple, practical, and efficient means for mechanically and automatically accomplishing this turning operation in a smooth and efficient manner, and without injury to the block or other mechanism.

Referring now more specifically to the drawings, the numeral 8 indicates a gyrating screen on which the hot cast blocks are placed in inverted position as they are removed from the moulds, this gyrating mechanism is mounted on a main frame 9, and a gyrating shaft assembly 10 is journaled on said frame, a screen frame 11 being carried by said shaft, and is driven by means of a motor 12 as usual, inclined tracks 13 are also associated with the screen to support the blocks as they travel thereover, said blocks discharging into the feed lip 14, which is mounted on the frame 15 of the turning mechanism.

The turning mechanism proper is mounted on the frame 15 and is preferably constructed of metal shapes and plates, said mechanism including a cylindrical drum 16 divided into compartments 17 by means of the channel shaped members 18 and to which the spaced apart steel rails or track sections 19 are secured in the usual manner, a transversely disposed shaft 20 extending through said drum and being journaled in suitable bearings 21 provided on the frame so that it may be rotated in a manner to be presently described.

Identically similar block cradles 22 are pivotally hung in the respective compartments by means of bolts 23, which are anchored in the end walls of the drum and stops 24 are also mounted in said end walls and serve to limit the movement of the cradles, each cradle comprising a frame 25 provided with a plurality of spaced apart, transversely disposed rollers 26 on the lower face thereof, the upper leg of said cradle being disposed directly adjacent the ends of the rails 19, and an opening 27 is provided in the rim of the drum to permit the entry and discharge of the block.

An auxiliary back wall 28 is provided on each cradle and is resiliently mounted as shown, bolts 29 being provided in the auxiliary back and project through the cradle frame, a spring 30 being provided on each bolt and is interposed between the auxiliary back and the frame so that when the block "B" or other article to be turned slides onto the tilted cradle, the shock will be absorbed by this auxiliary back, resilient blocks 31 are mounted on the end of the bolt beyond the frame and serve to cushion the recoil.

The driving mechanism comprises a suitable motor 32 mounted on the motor support 33, and the motor shaft 34 extending into a speed reducer 35, and a coupling 36 is provided intermediate the length of the shaft 34 as usual, said shaft driving through the speed reducer and imparting motion to the shaft 37 and the gear 38, which is mounted thereon, this gear 38 meshing with and driving a ring gear 39 which is secured to the side wall of the cylindrical drum, a magnetic brake 40 being provided on the motor and for a purpose to be hereinafter explained.

The inclined feed lip is constructed as clearly shown in Fig. 3 of the drawings, angle sections 41 being secured to the side walls of the frame 15 by means of bolts 42, and angle bars 43 are mounted thereon, spaced apart, transversely disposed rollers 44 being journaled in said angle bars and over which the block or article travels on its way to the cradle, these rollers eliminating friction, and it will be obvious that this lip can be readily raised or lowered by providing a plurality of vertically spaced bolt holes 45 in the side walls of the frame.

An inclined discharge lip 46 is provided on the opposite end of the frame 15 and is adjusted in the same manner as is the feed lip, said discharge lip comprising spaced apart tracks or rails 47 which are mounted on the transverse supports 48, the ends of the rails being in alignment with the gyrating screen assembly X, said screen including a frame 49, and a screen frame 50 which is mounted on the shaft assembly 51, all of which is driven by the motor 52 as usual, said screen being substantially the same as the gyrating screen on the opposite end of the turn over mechanism, and the blocks which are now in upright position are further cleaned during their course of travel over this screen, and being in upright position are ready for handling in any desired manner.

The turn-over mechanism is all automatically controlled by means of the photo electric control equipment shown in Fig. 4 of the drawings, and includes the motor and motor control 32 and 53 respectively, a photo tube holder 55 is located on the one side of the machine, and a light source 56 is located on the opposite side, a similar safety photo tube holder 57 being located adjacent to and on the same side of the machine as is the holder 55, and a safety light source 58 is located on the opposite side of the machine, slotted openings 59 and 60 respectively being provided in the side walls of the drum so that when the mechanism is in a certain predetermined position and there is no cylinder block in the cradle, the light beam will pass directly through the slotted openings and strike the photo tube holders located on the drive side of the machine, the interception of these light beams controlling the starting of the machine, and when there is no interception, the motor will not be energized and remains stationary, there is also provided a manually operated push button 61, and a reversing switch 62 for manual operation when desired.

The light source, tube holders, motor etc. are all suitably wired so that they function in the proper manner, and I do not deem it necessary to describe this wiring in detail as it forms no part of the present invention.

The operation of the turn-over is all automatically controlled by the photo electric control equipment, and in practise the mechanism is first energized, the two light sources 56 and 58 located on the side opposite the drive will be lighted, and the beams from these two light sources pass directly through the slotted openings in the side walls of the drum and fall upon the two photo tube holders unless obstructed by a block or other article being handled.

To start one cycle of the turn-over a block slides over the rollers in the feed lip and into the cradle 22, and when in this position the block will obstruct the light beam from the control light source 56, which in turn excites the motor 32, releases the magnetic brake 40, the drum 16 will then revolve through an arc of 180 degrees until the light beam again falls on the control photo tube 55. When the light beam falls on the control photo tube 55 the motor is shut off and the magnetic brake 40 is applied, causing the drum to come to an abrupt stop with the light still showing on the control photo tube 55, now as the block slides out of the cradle and onto the discharge lip 46, the light 58 from the safety light source again falls on the safety photo tube holder 57, and the motor is again energized to repeat the turn over process, provided there is a block in the cradle in the feed end of the machine.

If for any reason the block does not discharge from the machine, the light beam will remain intercepted and the machine will remain stationary, which also holds true if there is no block in the feed end cradle.

The machine is entirely automatic, the blocks automatically feed in and out of the drum without the aid of workmen or operators, and if blocks do not clear or leave, the drum will remain stationary until the difficulty has been remedied by the block moving out of the path of the light beam.

From the foregoing description it will be obvious that I have perfected a very simple, practical, and economical machine for automatically turning heavy, hot, or other articles from inverted to upright position.

What I claim is:

1. A turn-over machine of the character described and comprising a main frame, a drum revolvably mounted thereon, rails secured therein and dividing said drum into individual compartments, pivots fixed to the drum, a work receiving cradle pivotally hung in said pivots in each compartment, means for limiting the pivotal movement of each cradle, a feed lip on one end of the frame and in alignment with one of the cradles when the drum is in predetermined position, a discharge lip on the opposite end of the frame and in alignment with the dividing rails when the work is discharged, means for driving said drum, and automatic means for controlling said driving means.

2. A turn-over machine comprising a frame, a rotatable drum journaled thereon, rails dividing said drum into individual compartments, pivots fixed to said drum, a separate individual work carrying cradle pivotally hung on said pivots in each compartment and provided with a resilient back wall, an inclined feed lip, an inclined discharge lip, means for driving said drum, and automatic means for controlling said driving means.

3. A turn-over device comprising a main frame, a drum revolvably journaled thereon, rails dividing said drum into separate compartments, pivots fixed to said drum, a cradle pivotally hung on said pivots in each compartment, means for limiting the pivotal movement of said cradle, a driving means for said drum and including a motor and magnetic brake, and automatic means for controlling said motor and brake.

4. A turn-over device of the class described and including a frame, a rotatable drum, pivots fixed in the drum, opposed work carrying cradles pivotally hung on said pivots, stops for limiting the pivotal movement of said cradles, means for driving said drum, and means for automatically controlling the starting and stopping of said driving means.

5. A turn-over device of the class described and comprising a frame, a feed lip, a drum rotatably mounted on the frame, pivots fixed to said drum, opposed work carrying cradles pivotally hung on said pivots, stops for limiting the pivotal movement of the cradles, means for driving said drum, and means located on opposite sides of the device and affected by the "load" in the drum for controlling said driving means.

6. A material handling apparatus comprising a main frame, a rotatable hollow drum, pivots fixed in said drum, opposed work carrying cradles pivotally hung on said pivots, each cradle comprising a frame provided with a plurality of anti-friction rollers on the lower face thereof and a yieldable end wall, stops for limiting the pivotal movement of the cradles, means for driving said drum, and means for controlling the starting and stopping of said driving means.

7. In combination, a material handling apparatus, a shaker conveyor for receiving the material, means for driving said conveyor, a turn-over device including a revolvable drum having pivots fixed therein, opposed work carrying cradles pivotally mounted on said pivots and adapted to receive the material to be turned immediately from said conveyor, means for driving said turn-over device, a second conveyor for receiving the turned material from the turn-over device, and means for automatically controlling the turn-over mechanism.

GEORGE W. BEHNKE.